April 23, 1946.　　　　P. T. BAGNE　　　　2,398,763
ROTARY CUTTER
Filed Feb. 8, 1945　　　　3 Sheets-Sheet 1
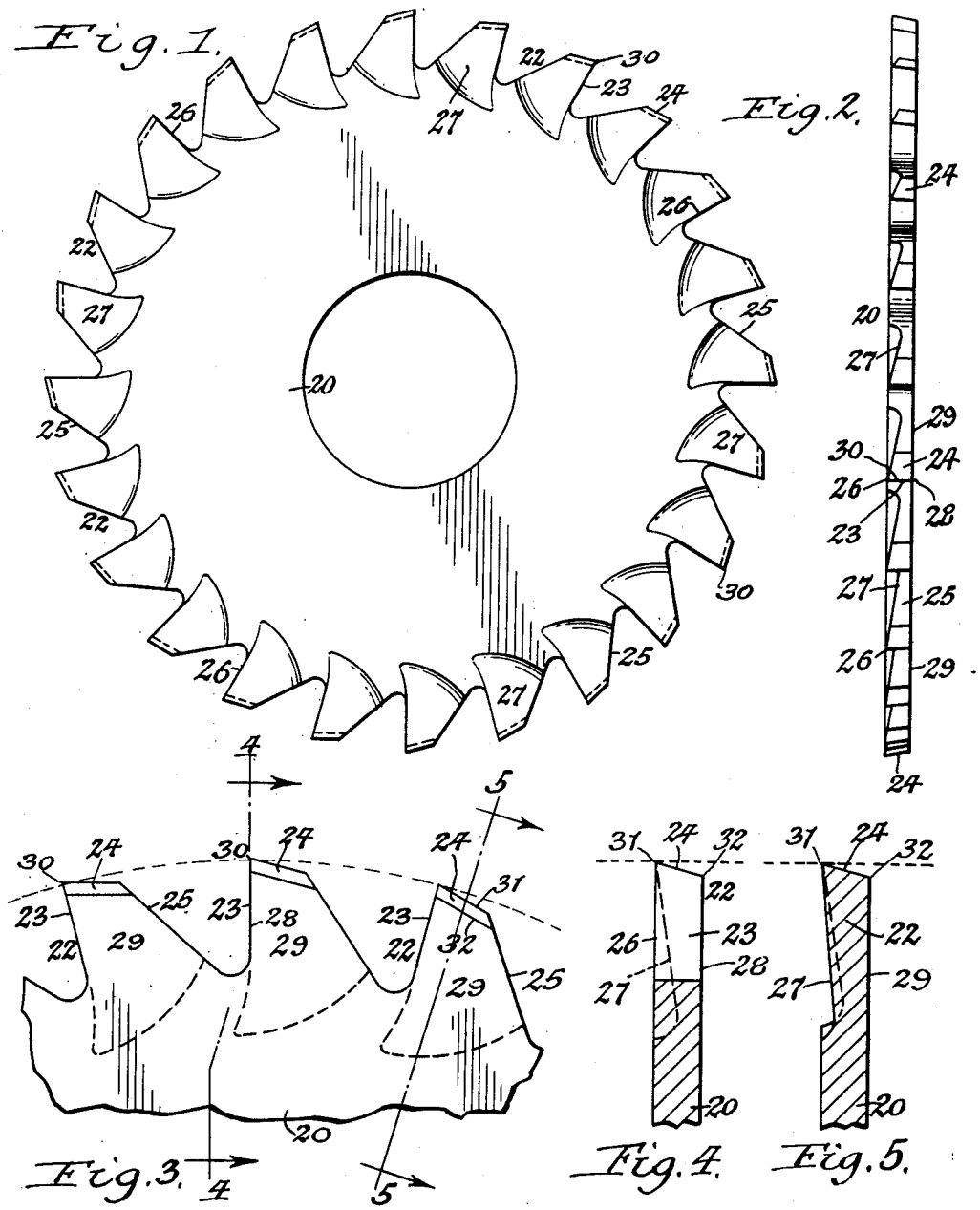

April 23, 1946.   P. T. BAGNE   2,398,763
ROTARY CUTTER
Filed Feb. 8, 1945   3 Sheets-Sheet 2

INVENTOR.
Paul T. Bagne
BY
Attorneys.

April 23, 1946.   P. T. BAGNE   2,398,763
ROTARY CUTTER
Filed Feb. 8, 1945   3 Sheets-Sheet 3

INVENTOR.
Paul T. Bagne
BY
Attorneys.

Patented Apr. 23, 1946

2,398,763

UNITED STATES PATENT OFFICE 2,398,763
ROTARY CUTTER

Paul T. Bagne, Kenmore, N. Y., assignor of one-half to Leo M. Fleming, Kenmore, N. Y.

Application February 8, 1945, Serial No. 576,776

1 Claim. (Cl. 29—103)

This invention relates to endless cutters which are more particularly intended for cutting relatively soft material such as soft rubber, cotton, felt and similar bodies having a loose texture or fibrous body. The cutters heretofore employed for cutting materials of this character have been unsatisfactory due, in the case of cutting soft rubber, to the cutter heating the rubber and burning the same and forming a hard crust thereon, and in the case of cutting cotton and felt, leaving the cut surface torn and ragged after the cutting operation is finished.

It is the object of this invention to provide an endless cutter whereby articles of relatively soft rubber, cotton, felt and similar fibrous or loose textured materials may be readily and quickly cut without heating or hardening the same and without forming a ragged or torn surface, but instead leaving a relatively even and smooth surface thereon when the cutting operation has been completed.

In the accompanying drawings:

Fig. 1 is a side elevation of an endless cutter of the rotary type embodying this invention and viewed from its front side.

Fig. 2 is an edge view of the same.

Fig. 3 is a fragmentary side elevation, on an enlarged scale, of the cutter shown in Fig. 1, but viewed from the rear side thereof.

Figs. 4 and 5 are fragmentary sections taken on the correspondingly numbered lines in Fig. 3.

In the following description, similar characters of reference indicate like parts in the several figures of the drawings:

Figure 6:
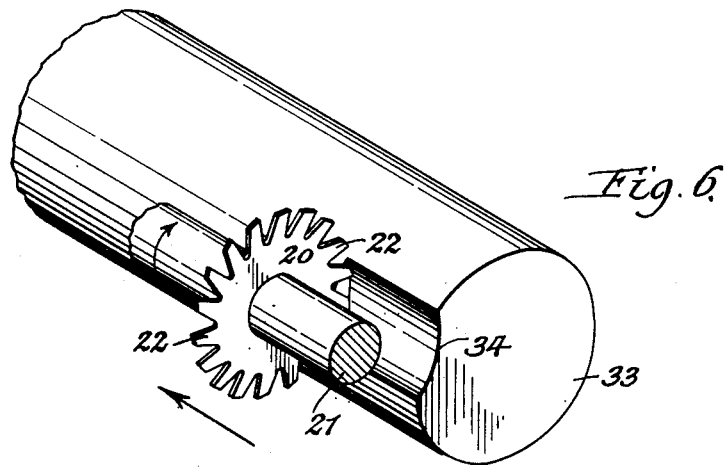
Fig. 6 is a perspective view showing this cutter used for forming a longitudinal groove in the side of a roller.

Referring to Figs. 1-8, the numeral 20 represents the body of the cutter which preferably has the form of a circular disk and made of sheet steel or other suitable metal. This body is adapted to be rotated continuously in one direction and for this purpose may be mounted in various ways upon a rotary driving shaft 21 which is journaled in a suitable bearing or appropriate support and driven by power from any available source.

On its periphery the cutter body is provided with a plurality of cutter teeth 22 arranged in an annular row and preferably formed integrally thereon, although the same may be made separate therefrom and detachably mounted thereon in any approved manner.

These teeth are spaced from one or another and each tooth is generally of outwardly tapering form and has a front transverse face 23 which is preferably arranged radially relative to the axis of rotation of the cutter body, a peripheral outer face 24 which extends circumferentially rearward from the outer end of the front face 23, and a rear face 25 which inclines rearwardly and inwardly from the rear end of the respective peripheral face at a tangent relative to the axis of rotation of the cutter body.

The radial corner 26 between the front face of each tooth and the respective lateral working side 27 of the same is sharpened to form the cutting edge of this tooth while the companion radial corner 28 between this front face of this tooth and the opposite lateral non-working side 29 of the same does not constitute a cutting edge although it is of angular form.

The lateral working side 27 of each tooth recedes or is undercut circumferentially from the cutting edge 26 of the same and recedes or is undercut radially inward from the circumferential outer face of this tooth along the working side of this tooth to the root of the same, thereby forming a concave face, clearance space or pocket on the respective side of the tooth, as shown in Figs. 2 and 5 which receives the material removed from the workpiece by the cutting edge of the tooth and permits this removed material to escape and not interfere with the further cutting operation of this tooth on the workpiece.

No cutting action is performed by the transverse corner 30 between the outer end of the front face 23 and the peripheral face 24 of the tooth, nor by the circumferential corners 31, 32 between this peripheral face and the lateral working side 27 and the lateral non-working side 29 of the tooth, nor by the radial corner 28 between the face 23 and the lateral non-working side 29 of the tooth but the cutting effect is confined solely to the radial corner 26 which forms a cutting edge between the face 23 and the lateral working side 27 of the tooth, which corner 26 is sharpened so that this cutter can only perform a cutting operation on the workpiece by engagement of the same by the working sides of its teeth.

The peripheral face 24 of each tooth not only recedes from the front transverse corner 30 of the same inwardly toward the axis of the cutter, as shown in Figs. 1 and 3, but this peripheral surface also inclines laterally from the high circumferential corner 31 on the working side of this tooth to the low circumferential corner 32 on the non-working side of the same, thereby providing clearance space between the outer end of this tooth and the workpiece being cut, whereby additional opportunity is provided for the escape of material removed from the workpiece. Frictional engagement of the cutter and the workpiece is thus reduced to a minimum, thereby avoiding undue heating of the tool and the workpiece.

When operating on a workpiece by means of this cutter, the workpiece and cutter are moved one relative to the other on a line parallel to the axis about which the cutter rotates and during this movement only the radial cutting edge 26 of each tooth on the working side of the cutter produces any cutting effect on the workpiece.

Figure 7:
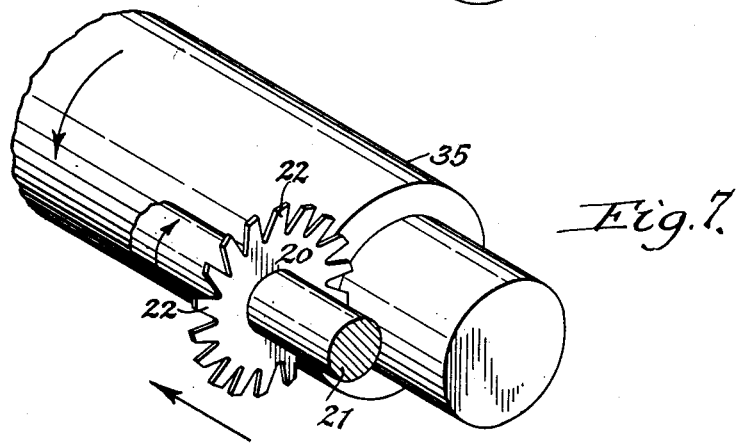
Fig. 7 is a similar view showing this cutter used for turning the periphery of a roller down to a smaller diameter.

It is customary, when viewing this cutter from the outer end of its tooth, to regard that side of the same on which the cutting edge of the teeth are on the left side of the cutter, as a "left-hand cutter," and if the cutting side of the teeth is on the right hand side of the cutter when viewing the teeth from the outer end thereof, then the cutter is usually regarded as a "right-hand cutter." Accordingly, the cutters shown in Figs. 1, 2, 3, 4, 9 and 10 are designated "left-hand cutters" and those shown in Figs. 6 and 7 are designated "right-hand cutters."

As the working side of the teeth of a cutter engage the workpiece, the radial cutting edges 26 thereof sever parts therefrom with a shearing or slicing action.

In order to secure the best results from the use of this cutter the same should be rotated while in engagement with the workpiece from 3500 to 20,000 revolutions per minute depending on the character of the material which is being cut.

Figure 8:
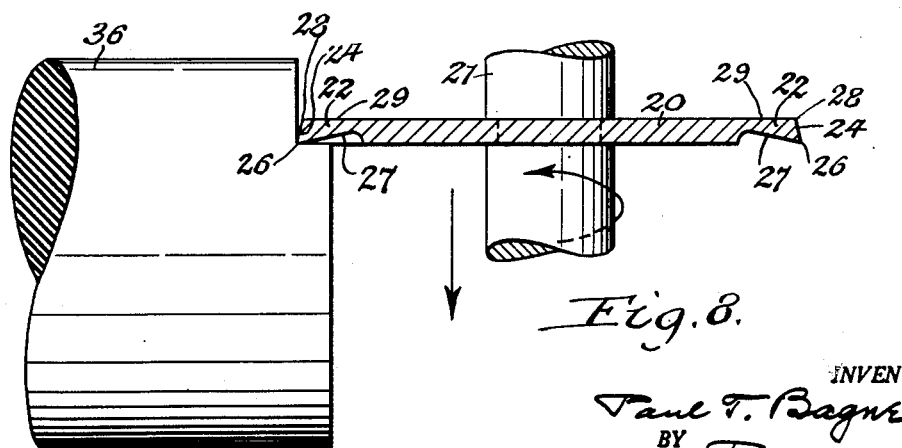
Fig. 8 is a top plan view, partly in section, showing this cutter used for facing the end of a roller.
Figure 9:
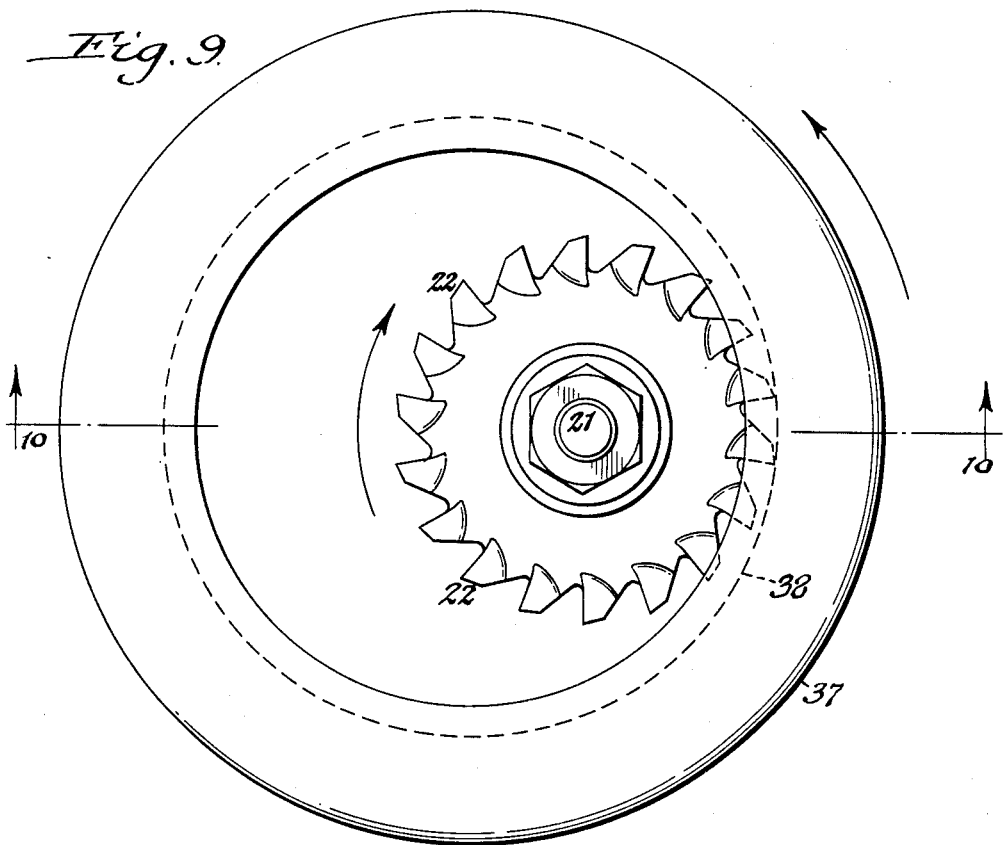
Fig. 9 is an end elevation of a hollow member, such as a cup, roller or tube, and a cutter embodying this invention showing the manner of cutting the bore of this member.
Figure 10:
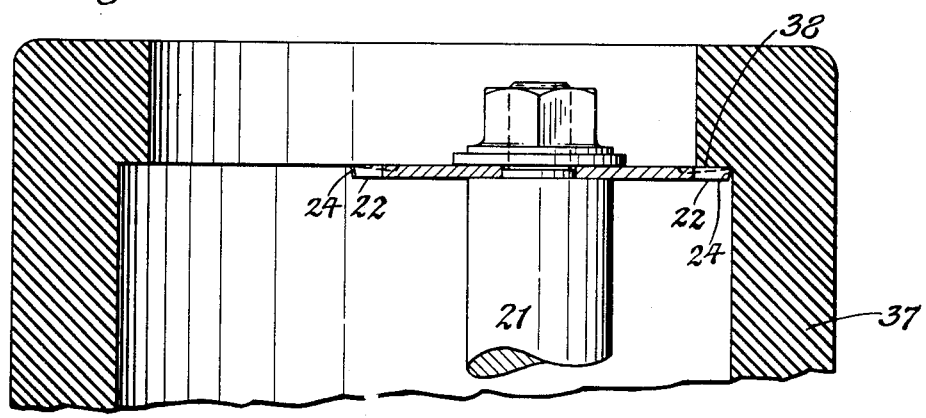
Fig. 10 is a longitudinal section taken on line 10—10, Fig. 9.

This tool may be used for performing various cutting operations, for example, in Fig. 6 the same is rotated about its axis and also moved bodily lengthwise of its axis relative to a stationary rubber roll or bar 33 of soft rubber or the like for cutting a longitudinal groove 34 in the side of the roller, in Fig. 7 the cutter is rotated circumferentially and moved axially to a rotating rubber roller 35 about an axis parallel with the axis of the cutter and operating on the periphery of this roller for reducing the diameter of the same, in Fig. 8 this cutter rotates about an axis arranged at right angles to the axis of a rubber roller 36 and is bodily movable radially relative to said roller for facing off one end of the same, and in Figs. 9 and 10 this cutter rotates about its axis and is movable lengthwise of its axis within a hollow rotating rubber cap, roller or tube 37 for increasing the diameter of its bore and forming an internal shoulder 38.

While operating on a workpiece by means of this tool the latter only produces a cutting or shearing effect on the workpiece but no grinding effect which otherwise would heat and burn the workpiece, if made of rubber and produce an objectionable hardened crust thereon.

The cutters made in accordance with this invention can also be used advantageously for cutting out parts of blowouts on rubber tires so that the same can be repaired by vulcanization quicker and better than has been possible heretofore.

This tool is also capable of forming grooves, threads in rollers, slabs and flat sheets of rubber and the like.

It also operates in a superior manner in place of tools heretofore used for boring rubber drums or rings, also making cork stoppers and plugs, also cutting sheet rubber into square or similar sections and may be utilized for facing the surface of rubber articles.

A further advantage in the use of this tool is that the scrap rubber cut off by the same is not burned or changed in character and therefore enables this scrap rubber to be used over again without loss of quality as though it were new rubber.

Owing to the relatively high speed at which this cutter must be used, the same is unsuited for use as a saw or milling cutter but when operating at high speed on relatively soft rubber, cotton, felt and materials of like texture or fibre, the same produces a cut surface which is even, smooth and uniform, and not attainable by any cutter heretofore employed in attempting to do similar work.

I claim as my invention:

A rotary cutter comprising a circular body provided on its periphery with an annular row of teeth each of which is provided with a radial cutting edge on one of its front corners, and a recess extending circumferentially rearward from said cutting edge on the same side of said tooth and said recess also extending radially inward from the circumferential outer corner thereof on the side of said tooth having said radial cutting edge and the outer circumferential face of said tooth inclining transversely toward the axis of the cutter from the side thereof which has said recess toward the opposite side of the tooth and said outer circumferential face of said tooth also receding inwardly toward the axis of the cutter from the front side of said tooth to the rear part of the same.

PAUL T. BAGNE.